United States Patent
Stansbury et al.

(10) Patent No.: US 11,692,778 B2
(45) Date of Patent: Jul. 4, 2023

(54) ENERGY STORAGE DEVICE

(71) Applicant: Westinghouse Electric Company LLC, Cranberry Township, PA (US)

(72) Inventors: Cory A. Stansbury, Gorham, ME (US); Edward C. Renaud, Cabot, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 82 days.

(21) Appl. No.: 16/547,950

(22) Filed: Aug. 22, 2019

(65) Prior Publication Data

US 2020/0011612 A1 Jan. 9, 2020

Related U.S. Application Data (63) Continuation-in-part of application No. 15/979,628, filed on May 15, 2018, now Pat. No. 11,248,851.

(Continued)

(51) Int. Cl.
*F28D 20/00* (2006.01)
*F28F 21/06* (2006.01)
*F28F 21/04* (2006.01)

(52) U.S. Cl.
CPC ......... *F28D 20/0056* (2013.01); *F28F 21/04* (2013.01); *F28F 21/062* (2013.01);
(Continued)

(58) Field of Classification Search
CPC ......... F28D 20/0056; F28D 2020/0021; F28D 2020/0069; F28D 2020/0078; F28F 21/04; F28F 21/062
(Continued)

(56) References Cited

U.S. PATENT DOCUMENTS 3,854,186 A * 12/1974 Sergeys ............... F28F 21/04
156/89.11
4,379,109 A * 4/1983 Simpson ............... B32B 18/00
156/89.22
(Continued)

FOREIGN PATENT DOCUMENTS

DE 8630338 U1 6/1987
DE 102009036550 A1 5/2010
(Continued)

OTHER PUBLICATIONS

International Search Report and Written Opinion of the International Searching Authority dated Sep. 13, 2018 for PCT/US2018/032685 (Forms PCT/ISA/220, PCT/ISA/210, PCT/ISA/237).
(Continued)

*Primary Examiner* — Tho V Duong
*Assistant Examiner* — Raheena R Malik
(74) *Attorney, Agent, or Firm* — K&L Gates LLP (57) ABSTRACT

An energy storage device includes a plurality of plates, each having a first and second surface, with at least one of the surfaces having a plurality of grooves formed therein. The device further includes inlet and outlet plenums for providing or receiving a heat transfer medium to or from the grooves. At least one of the first surface and the second surface having the plurality of grooves formed therein of a first plate is disposed in direct contact with the other one of the at least first surface and second surface of an adjacent second plate. Heat from the transfer medium is transferred to the plates in a charging mode of operation or transferred from the plates to the transfer medium in a discharging mode of operation when the heat transfer medium is passed along the grooves.

10 Claims, 9 Drawing Sheets

FIG.11

Related U.S. Application Data (60) Provisional application No. 62/522,737, filed on Jun. 21, 2017.

(52) U.S. Cl.
CPC ............... *F28D 2020/0021* (2013.01); *F28D 2020/0069* (2013.01); *F28D 2020/0078* (2013.01)

(58) Field of Classification Search
USPC .......................................................... 165/10
See application file for complete search history.

(56) References Cited

U.S. PATENT DOCUMENTS

| | | | | |
|---|---|---|---|---|
| 4,401,155 | A * | 8/1983 | Royal | F28D 9/0081 165/DIG. 392 |
| 4,993,481 | A * | 2/1991 | Kamimoto | F28D 20/023 165/10 |
| 5,184,669 | A * | 2/1993 | Tamme | F28D 20/003 165/10 |
| 5,222,298 | A * | 6/1993 | Schatz | F28D 20/021 29/890.03 |
| 5,239,839 | A * | 8/1993 | James | F28D 20/023 62/434 |
| 5,775,410 | A * | 7/1998 | Ramm-Schmidt | B01D 1/22 165/110 |
| 5,826,650 | A * | 10/1998 | Keller | F24D 11/0257 165/236 |
| 5,851,636 | A * | 12/1998 | Lang | B01J 19/32 428/167 |
| 6,071,593 | A * | 6/2000 | Lang | F28F 3/048 428/167 |
| 6,079,481 | A | 6/2000 | Lowenstein et al. | |
| 6,343,485 | B1 * | 2/2002 | Duerr | B60H 1/005 62/434 |
| 7,156,155 | B2 * | 1/2007 | Kudo | F28D 20/00 165/10 |
| 7,406,998 | B2 * | 8/2008 | Kudo | F28D 20/02 165/10 |
| 8,201,615 | B2 | 6/2012 | Soukhojak et al. | |
| 9,151,545 | B2 * | 10/2015 | Soukhojak | F28D 15/0266 |
| 9,440,881 | B2 | 9/2016 | Pinkerton et al. | |
| 10,471,803 | B2 * | 11/2019 | Bidner | B60H 1/00885 |
| 10,591,224 | B2 | 3/2020 | Bergan et al. | |
| 2008/0105417 | A1 | 5/2008 | Deaver | |
| 2009/0090109 | A1 | 4/2009 | Mills et al. | |
| 2009/0294092 | A1 * | 12/2009 | Bahl | F28F 21/02 165/10 |
| 2011/0016858 | A1 * | 1/2011 | Gaiser | F28D 9/0025 60/320 |
| 2011/0200156 | A1 | 8/2011 | Hyde et al. | |
| 2011/0200159 | A1 | 8/2011 | Hyde et al. | |
| 2011/0286724 | A1 * | 11/2011 | Goodman | F28D 20/00 392/346 |
| 2012/0312292 | A1 * | 12/2012 | Bahl | F24D 3/148 126/400 |
| 2014/0110080 | A1 | 4/2014 | Bergan | |
| 2014/0284021 | A1 | 9/2014 | Laurberg et al. | |
| 2014/0366536 | A1 | 12/2014 | Muren | |
| 2015/0052931 | A1 * | 2/2015 | Said | F28F 19/008 62/320 |
| 2015/0192370 | A1 * | 7/2015 | Suzuki | F28D 20/02 165/10 |
| 2016/0116188 | A1 * | 4/2016 | O'Donnell | F24S 60/00 126/714 |
| 2018/0372423 | A1 | 12/2018 | Stansbury | |
| 2019/0249932 | A1 * | 8/2019 | Bernehed | F28D 20/0056 |

FOREIGN PATENT DOCUMENTS

| | | |
|---|---|---|
| DE | 102011007335 A1 | 10/2012 |
| EP | 2017561 A2 | 1/2009 |
| EP | 2522047 A1 | 11/2012 |
| EP | 3247963 A1 | 11/2017 |
| JP | S59134763 U | 9/1984 |
| JP | S6234668 U | 2/1987 |
| WO | 02/01132 A2 | 1/2002 |
| WO | 2010051682 A1 | 5/2010 |
| WO | 2011079936 A2 | 7/2011 |
| WO | 2012140015 A1 | 10/2012 |
| WO | 2014026559 A1 | 2/2014 |
| WO | 2014100142 A1 | 6/2014 |
| WO | 2016065191 A1 | 4/2016 |
| WO | 2018077842 A1 | 3/2018 |
| WO | 2018236489 A1 | 12/2018 |

OTHER PUBLICATIONS

International Search Report and Written Opinion for International PCT Application No. PCT/US2020/040706, dated Oct. 27, 2020.
Brown, Bradley M., "Development of a Structured Concrete Thermocline Thermal Energy Storage System", Dec. 2011, 119 pp., University of Arkansas, Fayetteville, http://scholarworks.uark.edu/etd.
John, Emerson Esmond, "The Development of a High Performance Concrete to Store Thermal Energy for Concentrating Solar Power Plants", Aug. 2012, 194 pp., University of Arkansas, Fayetteville, http://scholarworks.uark.edu/etd.
John, Emerson, "Concrete as a thermal energy storage medium for thermocline solar energy storage systems", Solar Energy, Oct. 2013, 1-2 pp., vol. 96, Published by Elsevier Ltd.
Dr. R. Panneer Selvam, "Development and Performance Evaluation of High Temperature Concrete for Thermal Energy Storage for Solar Power Generation", 32 pp., University of Arkansas, Fayetteville.
Supplementary European Search Report for corresponding European Patent Application No. EP1882072.6, dated Mar. 2, 2021.

* cited by examiner

ENERGY STORAGE DEVICE

CROSS REFERENCE TO RELATED APPLICATIONS

This application is a continuation-in-part of U.S. patent application Ser. No. 15/979,628, filed May 15, 2018, which claims the benefit of U.S. Provisional Patent Application No. 62/522,737, filed Jun. 21, 2017, the contents of both are incorporated by reference herein.

BACKGROUND

1. Field

This invention pertains generally to energy storage and, more particularly, to a modular, low cost, thermal energy storage device.

2. Related Art

The creation of energy storage to levelize power on the electrical grid, avoiding the need for large amounts of spinning reserve, has been an extreme challenge. Due to an ever increasing roll-out of non-dispatchable renewable energy devices, like solar photovoltaic cells and wind turbines, grid stability has suffered. Traditional energy storage solutions, such as pumped storage and batteries, have either exhausted their capacity or are prohibitively difficult to cite due to environmental concerns. By storing energy as heat, either from a heat pump arrangement or from the sources of heat used to generate electricity, created just prior to the generation of electricity, rather than the storing of electricity, relatively low-cost storage may be achieved and utilized by a reactor in a nuclear power plant. Thermal storage in and of itself is not new, but what has been elusive is a design that can efficiently store energy in relatively low-cost modules using common materials, rather than expensive salts or geologic formations, which may not exist everywhere. Accordingly, it is an object of this invention to provide a low-cost, modular energy storage device that is constructed from common, easily acquired materials.

SUMMARY

These and other objects are achieved in one embodiment by an energy storage device comprising: a plurality of plates comprised of a concrete-like material, supported in tandem with a flow space there between large enough to pass a heat transfer medium substantially over a face of the plates. An inlet plenum, in fluid communication with a first end of the flow space, is configured to receive the heat transfer medium from a source and distribute the heat transfer medium through the flow space over the face of the plates. An outlet plenum, in fluid communication with a second end of the flow space, is configured to receive the heat transfer medium from the flow space and dispense the heat transfer medium to a return destination; wherein a portion of heat in the heat transfer medium is transferred to the plates in a charging mode of operation, or a portion of the heat in the plates is transferred to the heat transfer medium in a discharging mode of operation.

In one embodiment, the plurality of plates are housed in a metal casing and, preferably, the plates are supported on opposite edges and extend horizontally so the heat transfer medium flows horizontally with the heat transfer medium flowing in parallel through the flow spaces between the plates. Preferably, the heat transfer medium is an oil or salt.

In another embodiment the plates are fluted in a direction perpendicular to the direction of flow of the heat transfer medium, with the flutes spaced along the length of the plates to provide thermal breaks, slowing thermal diffusion along the length of the plates following a partial charge, i.e., transfer of heat between an area of the plate containing heat and an area of the plate which does not contain as much heat. Preferably, the flutes are spaced six inches to four feet along the length of the plates. The energy storage device is desirably configured to operate approximately between 140° F. and 600° F. In such an embodiment the energy device is configured so the charging and discharging operation is respectively in an opposite fluid flow direction equivalent to a counter-flow heat exchanger's operation. In such an embodiment the concrete-like plates may comprise micro rebar or other similar three dimensional reinforcement. In a further embodiment at least some of the flow space between the plates includes insulation and/or sections of at least some of the plates are insulated from downstream sections of those plates to form the thermal breaks. In another embodiment, smaller plates are employed, with the breaks between the plates providing such thermal breaks.

The invention also contemplates a method of storing thermal energy comprising the step of forming a heat transfer module having a plurality of heat transfer plates comprising a concrete-like material that are spaced from each other and supported in tandem to form a flow space there between, with the heat transfer plates enclosed within a housing having an inlet plenum at one end of the flow spaces and an outlet plenum at another end of the flow spaces. The method directs a heat transfer medium through the inlet plenum and over a face of and between the plurality of heat transfer plates; transfers heat from the heat transfer medium to the heat transfer plates; and exits the heat transfer medium from the housing through the outlet plenum.

Preferably, the directing step includes the step of directing the heat transfer medium in parallel, horizontally over and between the plurality of heat transfer plates. In one embodiment the method includes the step of reinforcing the heat transfer plates with micro rebar or other similar three dimensional reinforcement. Preferably, the method applies thermal breaks to the plates to retard diffusion of the heat along the length of the plates after a partial charge. In one embodiment, the thermal breaks are flutes that extend in a direction perpendicular to the direction of flow of the heat transfer medium. Preferably, the flutes are spaced six inches to four feet apart. In another embodiment, the thermal breaks are separations between adjacent, smaller plates.

The method also operates the heat transfer module approximately between 140° F. and 600° F. The method may also include a charging and discharging operation that is respectively in an opposite fluid flow direction equivalent to a counter-flow heat exchanger's operation.

In yet another embodiment an energy storage device comprises: a plurality of separate plates, each of the plates having a first surface and an opposite second surface with at least one of the first surface and the second surface having a plurality of grooves formed therein; an inlet plenum configured to receive a heat transfer medium from a source and distribute the heat transfer medium through the grooves; and an outlet plenum configured to receive the heat transfer medium from the grooves and dispense the heat transfer medium to a return destination. Each groove extends from a first edge of a respective plate of the plurality of separate plates disposed closer to the inlet plenum to an opposite second edge disposed closer to the outlet plenum. The at least one of the first surface and the second surface having the plurality of grooves formed therein of a first plate is disposed in direct contact with the other one of the at least first surface and second surface of an adjacent second plate. A portion of heat in the heat transfer medium is transferred to the plates in a charging mode of operation when the heat transfer medium is passed along the grooves or a portion of heat in the plates is transferred to the heat transfer medium in a discharging mode of operation when the heat transfer medium is passed along the grooves.

Each plate may be formed from a high specific heat material. Each plate may be formed from a concrete material. Each groove may be generally shaped like a circular segment when viewed along each groove. The plurality of separate plates may be arranged in a vertical stack with the first surfaces and the second surfaces disposed horizontally. The plurality of separate plates may be arranged vertically on edge, with the first surfaces and the second surfaces disposed vertically. Each plate may have a thickness between about 0.5 inches and about 6 inches. Each plate may have a thickness of about 4 inches. Each groove may have a depth of about 0.25 inches to about 1 inch. Each groove may have a width of about 0.5 inches to about 2.5 inches and may be separated from adjacent grooves by a separation distance of about 0.25 inches to about 2 inches. The device may be configured to operate approximately between 140° F. and 600° F. The plates may comprise micro rebar or other similar three dimensional reinforcement.

The invention further contemplates another method of storing thermal energy comprising the steps of: forming a heat transfer module having a plurality of separate plates, each of the plates having a first surface and an opposite second surface with at least one of the first surface and the second surface having a plurality of grooves formed therein; an inlet plenum; and an outlet plenum, wherein each groove extends from a first edge of a respective plate of the plurality of separate plates disposed closer to the inlet plenum to an opposite second edge disposed closer to the outlet plenum, wherein the at least one of the first surface and the second surface having the plurality of grooves formed therein of a first plate is disposed in direct contact with the other one of the at least first surface and second surface of an adjacent second plate; directing a heat transfer medium from the inlet plenum through the plurality of grooves of the plurality of separate plates to the outlet plenum; transferring heat from the heat transfer medium to the plurality of separate plates in a charging mode of operation or transferring heat from the plurality of separate plates to the heat transfer medium is a discharging mode of operation; and exiting the heat transfer medium from the outlet plenum.

The method may include the step of operating the heat transfer module approximately between 140° F. and 600° F. The charging mode of operation, in which heat is transferred from the heat transfer medium to the plurality of separate plates, and the discharging mode of operation, in which heat is transferred from the plurality of separate plates to the heat transfer medium, may respectively be performed in opposite fluid flow directions, equivalent to a counter-flow heat exchanger's operation.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

A further understanding of the invention can be gained from the following description of the preferred embodiments when read in conjunction with the accompanying drawings in which:

FIG. 1 is a simplified perspective view of a portion of the housing of an energy storage device in accordance with one example embodiment of the present invention showing several of plates in position with the flow space there between;

DETAILED DESCRIPTION OF EXEMPLARY EMBODIMENTS

Embodiments of the present invention provide arrangements and methods for storing thermal energy in a modular way using low cost materials.

One example approach in accordance with the present invention is shown in FIGS. 1-7. In such first example, thermal energy storage is carried out by aligning a plurality of plates 10 (shown in FIGS. 1, 2 and 3). Each plate 10 is of a thin cross section and formed from a high specific heat material. As used herein, a "high specific heat material" is a material having a heat capacity of at least 0.75 kJ/kg-K. Some examples of suitable high specific heat materials which have been employed in embodiments of the present invention include concrete, high performance concrete, ultra-high-performance concrete, high-strength concrete, and high-temperature concrete. Concretes including phase change materials, thermochemical materials, and/or high quantities of fly ash may also be employed. Such concrete materials provide for strong plates with a high heat capacity that can readily be formed from readily obtainable low cost materials. Some other examples of high specific heat materials from which plates 10 may constructed from firebrick, ceramic, solid salt or metals.

Plates 10 are positioned in close proximity to one another, with flow channels 12 formed between the plates 10. The plates 10 are then assembled in a low-cost metal module housing shell 14 with built-in guide slots 16 formed between adjacent separators 18, which maintain the spacing between the plates 10 that form the flow channels 12. Alternatively, separators which may be affixed to the plates 10 or cast in to the plates 10 may be utilized to space the concrete plates. The shell 14 is assembled and then two end caps 22 and 24 are positioned respectively at each end to the shell 14 and are affixed to shell 14, such as by welding, thus forming a plenum 26 between each of the ends of the plates 10 and each of the respective end caps 22 and 24. Sitting horizontally, the two plenums 26 and the channels 12 enable a heat transfer fluid (oil, salt, etc.) to be circulated among the plates 10, transferring energy to the plates 10 in a thermal gradient which will move down the length of the assembly as the "charge level" increases. When heat is to be extracted, the flow will be reversed, allowing the device to operate like a counter-flow heat exchanger. It is to be appreciated that the plenums 26 illustrated are shown for example purposes only and that one or more of the shape, size, inlet size, placement, quantity, etc. may be varied without varying from the scope of the present invention.

Figure 2:
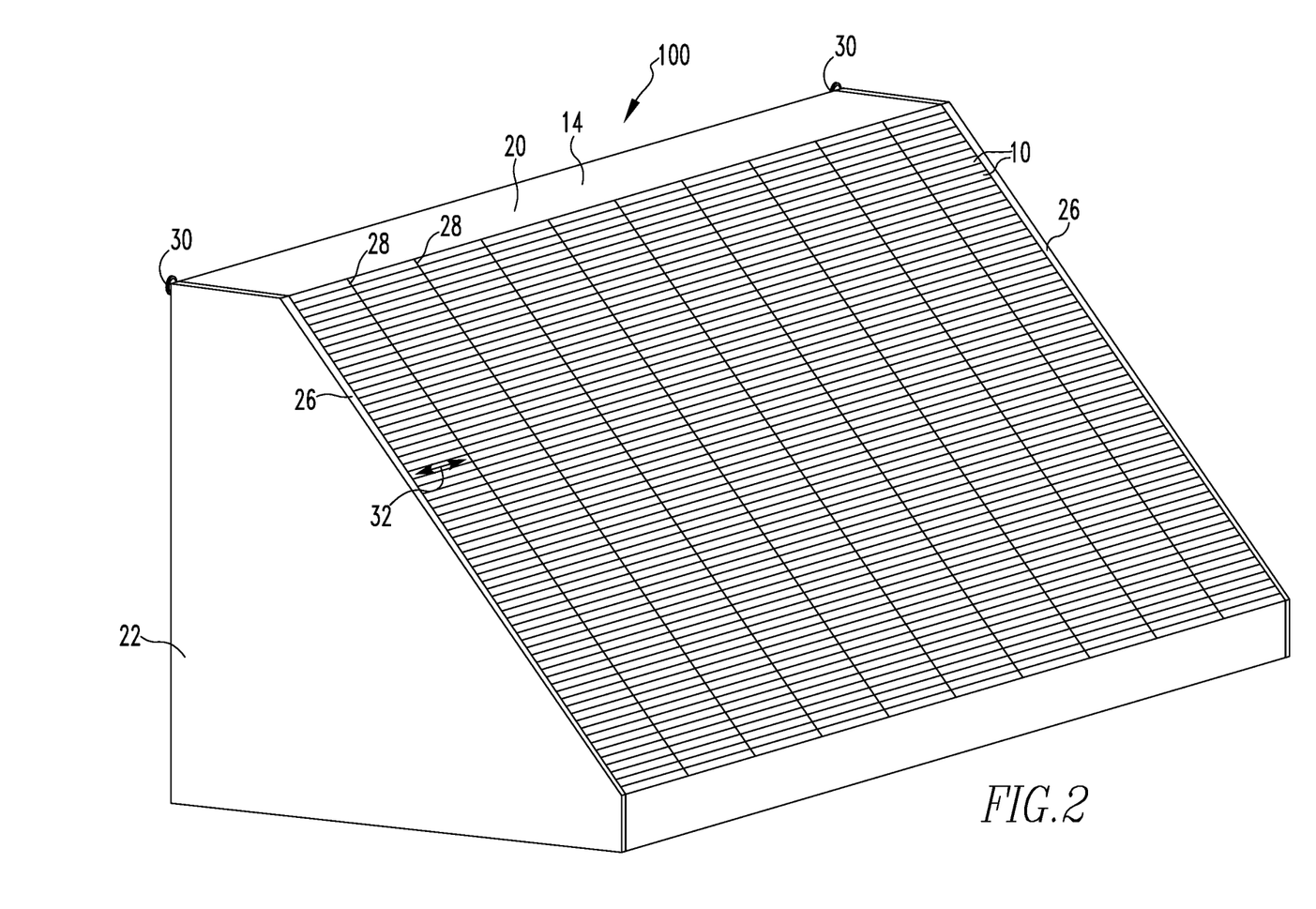
FIG. 2 shows a cutaway view of an entire module of an energy storage device in accordance with one example embodiment of the present invention including an the intake plenum and all of the plates that show the thermal breaks.

Each of the plates 10 may be fluted, i.e., grooved in the vertical direction (i.e., perpendicular to the flow direction) substantially along the entire height of the concrete plate 10, at each given distance along the length of the plate 10 to reduce the effect of a heat wave moving down the plate 10 when the heat transfer fluid is not flowing. The given distance is preferably six inches to four feet, but can be longer, depending on the length of the module 100 (FIG. 2). The flutes 28 can be clearly observed in FIG. 2. Alternatively, smaller, separate plates 10 can be used with the breaks between adjacent plates 10 functioning in a similar manner as flutes 28. Additionally, such smaller plates generally provide for easier assembly.

Figure 1:
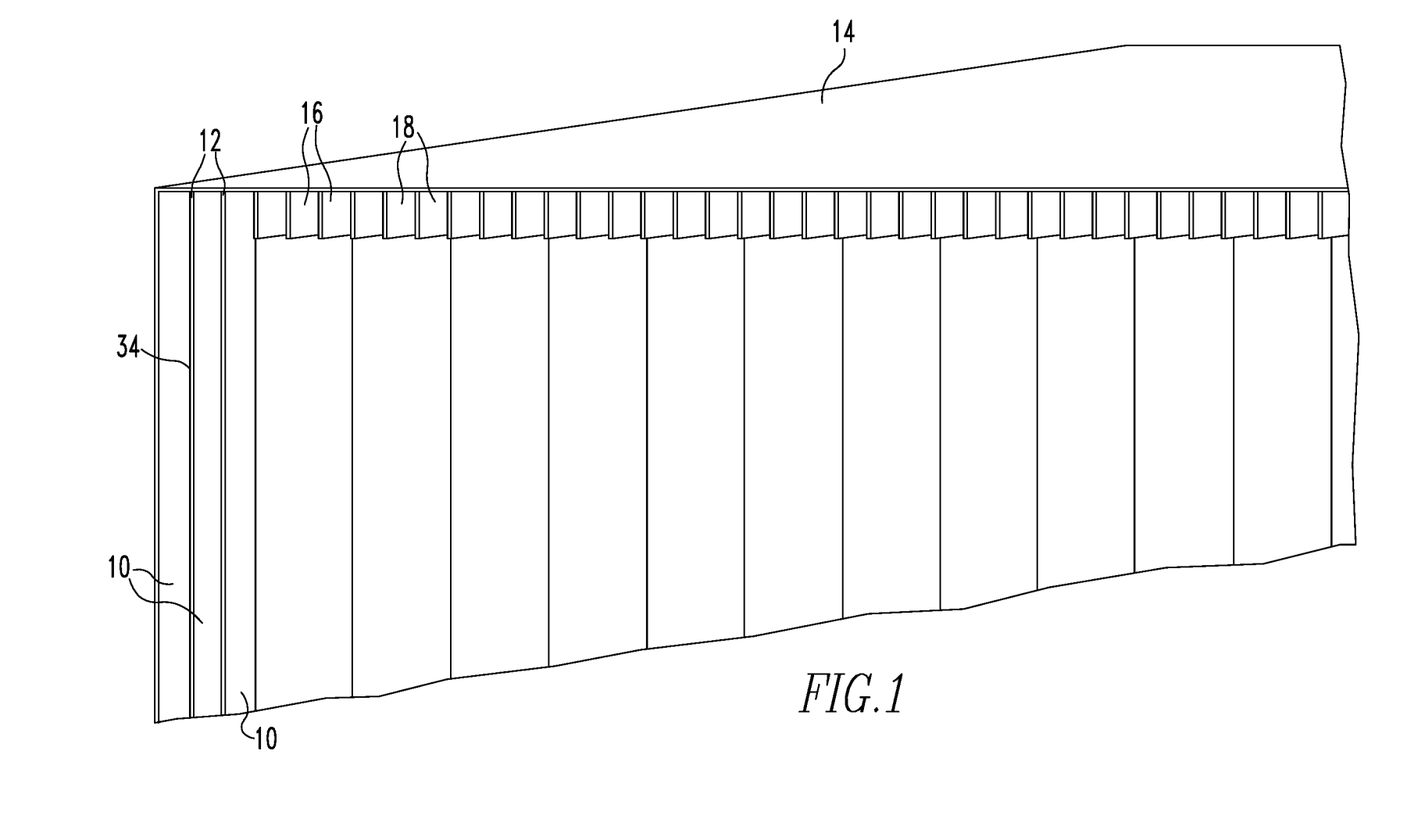

Thin strips of material, including but not limited to insulating materials, figuratively represented in FIG. 1 by reference character 34, can also extend from one plenum to the other along the center of the flow channels 12 in order to tie the structure together and maintain plate spacing, while not negatively impacting performance characteristics. Insulation can also be embedded in the flutes 28 or replace the flutes altogether and tie adjacent sections of the heat transfer plates together. Though the plates 10 are shown extending in the horizontal direction it should be appreciated that they could be configured, alternately, to extend in the vertical direction and still be within the scope of this invention, though the horizontal flow path is preferred due to lesser static pressures in equivalent embodiments.

Accordingly, one embodiment of this invention employs a concrete structure formed from a plurality of plates 10 encased in a housing 20 (i.e., shell 14 and end caps 22 and 24) with a large surface to area ratio for storing thermal energy from a heat source such as a nuclear reactor or a heat pump. Preferably, the plates 10 are formed from a concrete material and include micro-rebar or other similar admixture to enhance strength, durability, and heat transfer. Alternatives to micro-rebar include steel, steel fibers, fiberglass, carbon fiber, other metals, composites and high temperature plastics. No piping need be utilized, but metal tubing or composite tubing may be employed as an alternative to the foregoing preferred channel structure. All of the heat transfer medium within the module is directed by a metal casing or relatively thin concrete plates employed within the casing to store the heat.

Flow channels for the heat transfer medium or fluid are formed between adjacent plates 10, maximizing surface area and minimizing the conduction distance and pumping power needed to drive the heat transfer medium. The separators 18 may be thin material strips, rods or bars and may be constructed out of high temperature plastic, metal, composites or fiberglass. Preferably, the heat transfer medium is unpressurized and comprised of an oil or salt with suitable properties as to not negatively interact with the concrete or metal structure, which can be treated with a protective coating to deter such an interaction. The heat transfer medium may be hydrocarbon based fluid such as Therminol, Duratherm HF, Calder 1, Mobiltherm, Paratherm, Dowtherm or Phillips 66, a silicone based fluid such as Duratherm S or Syltherm or a liquid salt such as Nitrate salts.

In one embodiment, the plates 10 are fluted along their height, i.e., perpendicular to the flow of the heat transfer medium, as to provide thermal breaks, slowing thermal diffusion between plates 10 following a partial charge, i.e., a transfer of heat from the heat transfer medium to the plates 10 that only partially fills the capacity of the plates 10 to store the heat. The thermal breaks impede the plates 10 from equalizing the temperature across the plates, which otherwise, after a partial charge, would prevent a high quality recovery of the heat during a discharge. In another embodiment, separate smaller plates are used, with the separations between adjacent plates providing thermal breaks.

The housing 14 may be formed from plastic, coated carbon steel, stainless steel, composites or fiberglass and is preferably provided with insulation either layered within, around the inside or around the outside of the housing. The insulation may be an air gap in a multi-layered shell, fiberglass, foam glass, Aerogel, ceramics, mineral fiber/wool or silica.

The energy storage device of FIGS. 1-7 may be operated with the plates 10 in either a horizontal or vertical orientation. Additionally, the shell 14, end caps 22 and 24 and the plates 10 may be constructed at the site of use, or the fully constructed housings 14 and the plates 10 may be shipped separately and assembled on site, or any combination thereof.

Thermal energy will be loaded and unloaded from the fluted structure using a moving thermal gradient along the long axis of the plates 10. Temperatures of operation will be as low as 140° F. and as high as 600° F. Charging and discharging operation will occur with opposite fluid flow direction as to resemble a counter-flow heat exchanger's operation. Micro rebar or similar admixture may be used in place of traditional concrete reinforcement, as to minimize manual labor and maximize production efficiency.

Preferably, the pressure of the incoming heat transfer medium is at atmospheric pressure or slightly above; that is 14.5 to 21.8 psia. The flow rate of the heat transfer medium, desirably, is approximately between 0-22.0 lbs/s and, preferably, about 4 lbs/s per module. The plates 10 are approximately between 0.5-6 inches thick and, more preferably, about 4 inches thick. The flow spaces are about between 0.04 inches and 0.5 inches and, more preferably, about 0.4 inch wide.

FIG. 1 shows the shell 14 with three of the plates 10 spaced by the modular guide slots 16 extending from the underside of the upper wall of the shell 14 portion of the housing 20, to form the flow spaces or channels 12 between the plates 10. The fluting 28 is shown as grooves extending vertically, however, the flow of the heat transfer medium preferably extends horizontally, in parallel through the flow spaces over substantially the entire faces of the plates 10; however, it should be appreciated that the flow may also be directed vertically with a plenum on the top and bottom of the module instead of on the ends.

Figures 3, 4:
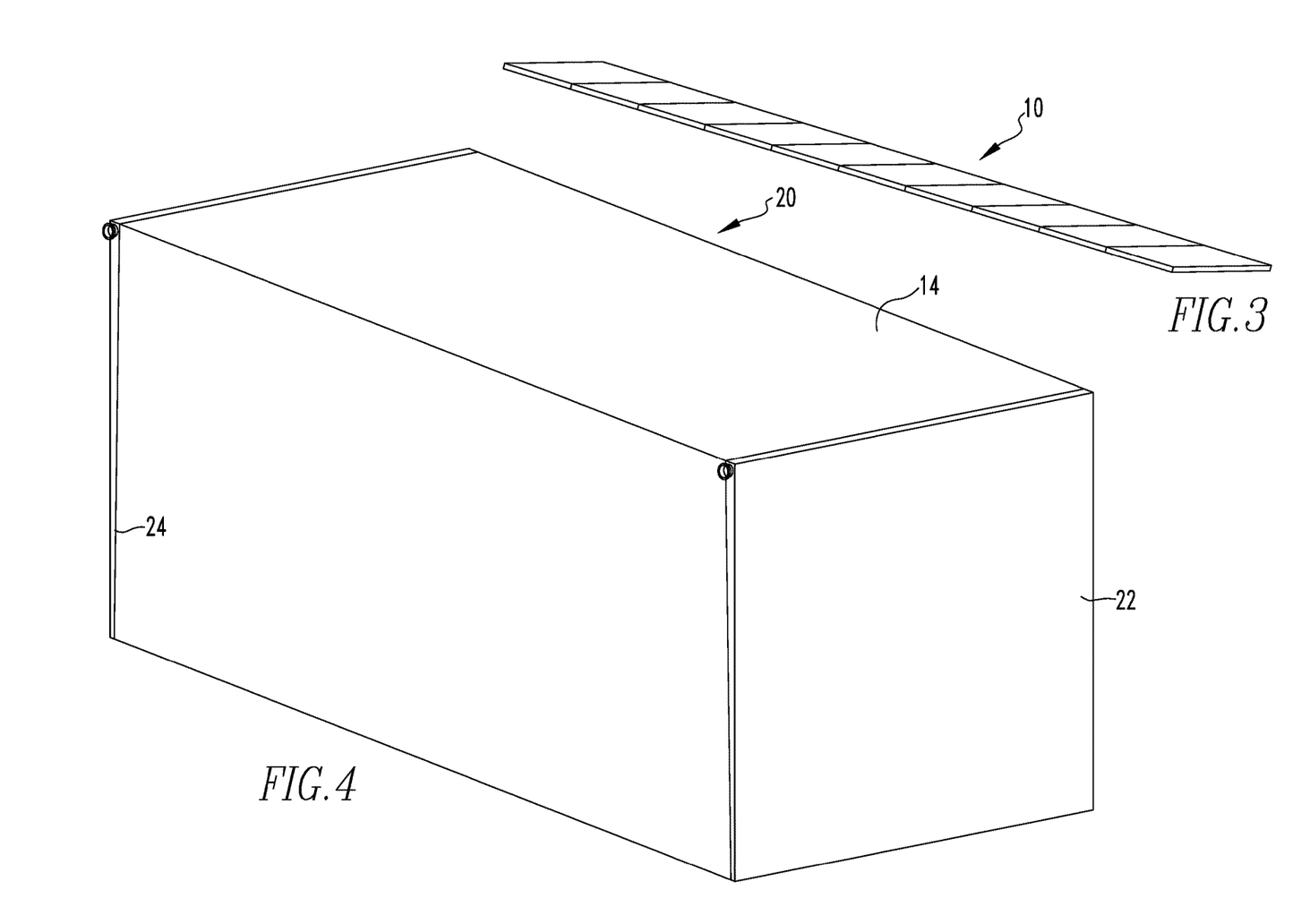
FIG. 3 is a simplified perspective view of one of the plates of the arrangements of FIG. 1 or 2.
FIG. 4 is a simplified perspective view of an entire assembled energy storage device housing in accordance with one example embodiment of the present invention.
Figure 5:
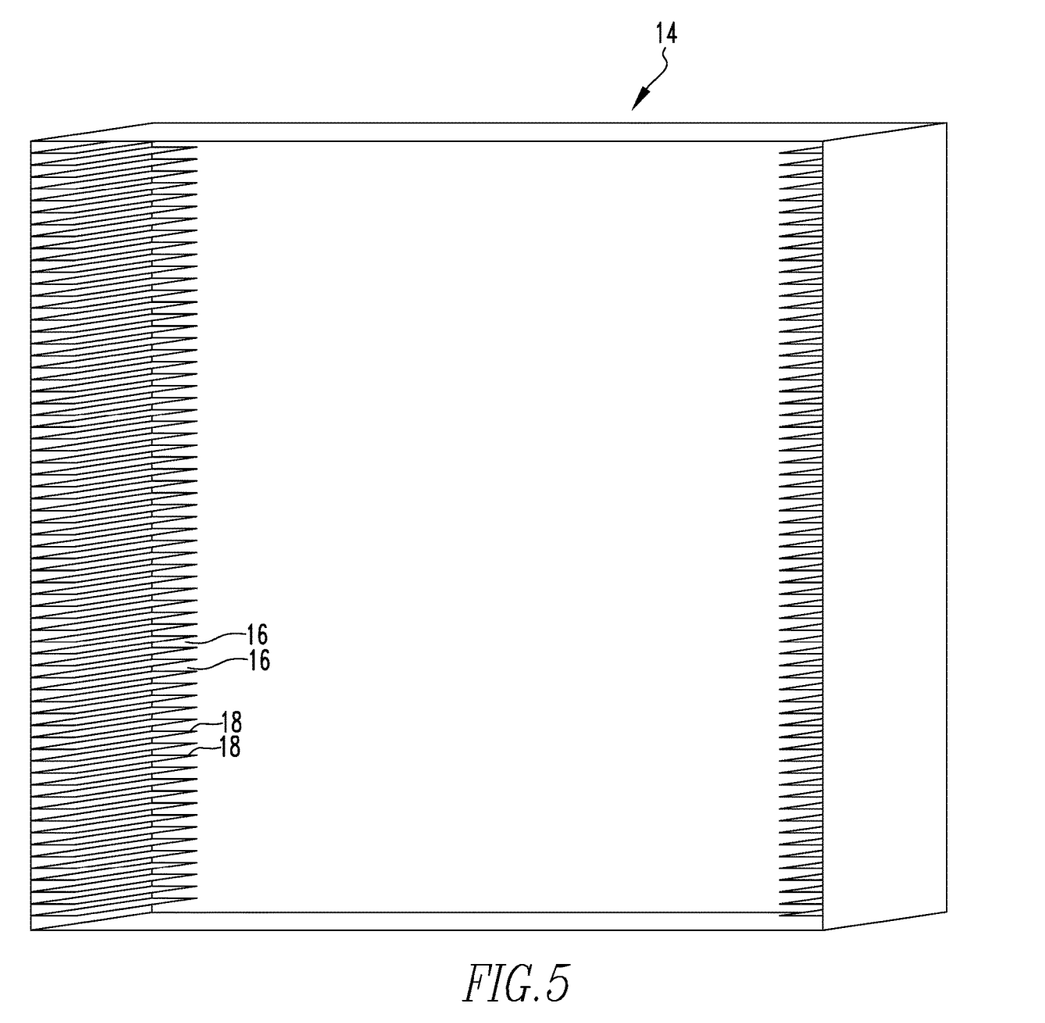
FIG. 5 is a simplified perspective view of the outer elongated shell of FIGS. 1, 2 and 4 that extends the longitudinal extent of the housing, with the plate holders shown in a position that would support the plates horizontally.
Figure 6:
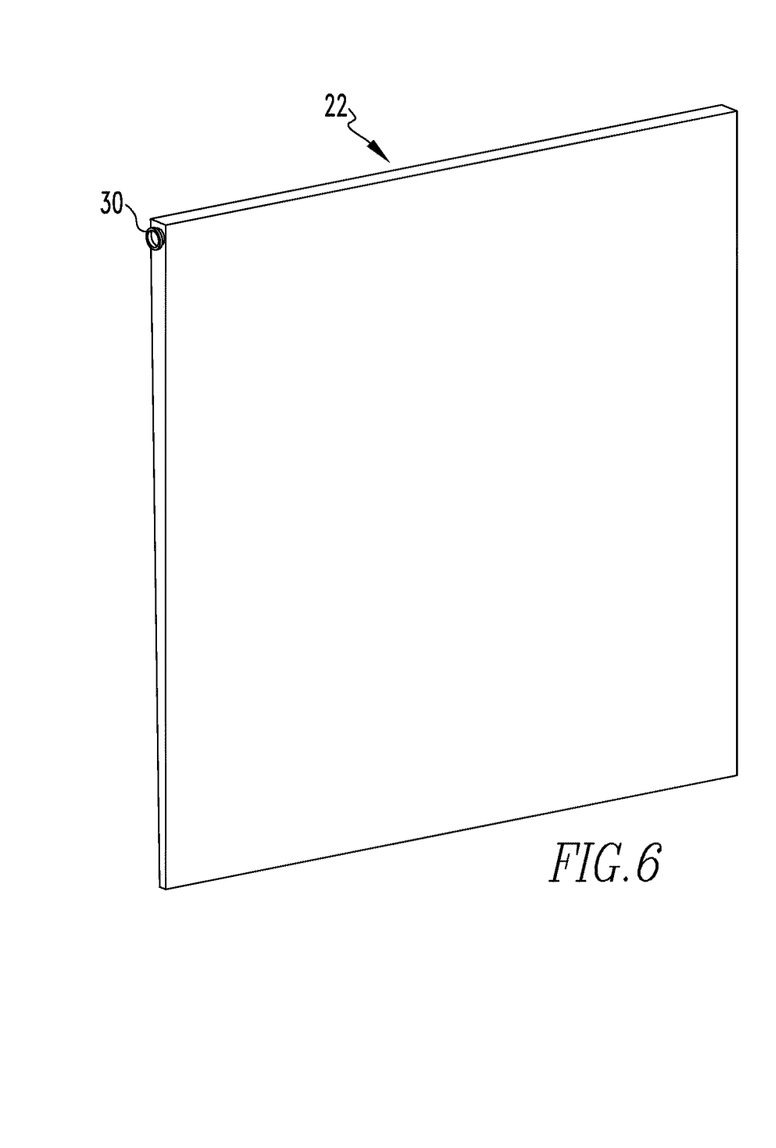
FIG. 6 is a simplified perspective view of one end cap that closes off one end of the shell shown in FIG. 5.
Figure 7:
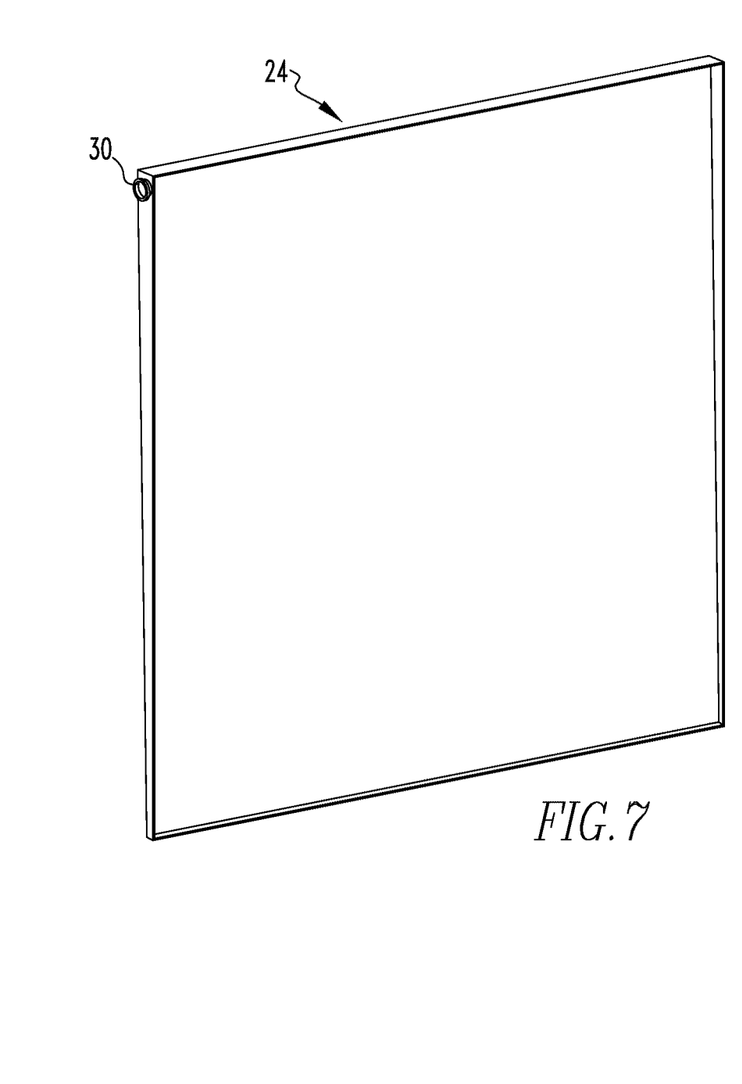
FIG. 7 is a simplified perspective view of a second end cap that closes off the second end of the shell shown in FIG. 5 and is a mirror image of the one end cap shown in FIG. 6.

FIG. 2 shows a cutaway of a whole module 100 including all of the plates 10 with a plenum 26 on either end of the elongated dimension of the plates 10, with the plenum on the left side being more visible and having an inlet or outlet nozzle 30 shown in the upper left corner of the module 100. It does not make any difference if the plenum 26 on the right or the one on the left is the inlet plenum or outlet plenum, because the heat transfer medium, indicated by the double headed arrow 32 in FIG. 2, will be flowing in both directions, one direction to charge the plates 10 and the opposite direction to discharge heat from the concrete plates. FIG. 3 is a perspective view of one of the plates 10. FIG. 4 shows a perspective view of the housing components assembled and FIGS. 5, 6 and 7 shows perspective views of the housing components disassembled.

Referring now to FIGS. 8-11, another embodiment of an energy storage device 200 in accordance with another example embodiment of the present invention will now be discussed. Similar to the arrangement previously discussed in regard to FIGS. 1-7, device 200 employs a plurality of plates 210 of similar material construction as plates 10 previously discussed, positioned within a low-cost metal module housing shell 220 (shown schematically in hidden line in FIG. 8) such that plenums 226 are formed at either end of the device 200. Unlike the arrangement previously discussed which relied upon spacing plates 10 apart in order to form flow channels 12, the arrangement shown in FIGS. 8-11 utilizes a plurality of grooves 212 that are formed in each of plates 210 for creating the flow paths for a heat transfer fluid (e.g., oil, salt, etc.) to be circulated among the plates 210. Each groove 212 extends from a first edge (not numbered) of a respective plate 210 disposed near a first one of plenums 226 to an opposite second edge (not numbered) disposed closer to the opposite second one of plenums 226. As shown in the example embodiment illustrated in FIGS. 8-11, each groove 212 may extend in a straight line across each plate 210. Alternatively, one or more of grooves 212 may extend in a non-straight manner (e.g., curved, serpentine, zig-zag, etc.) without varying from the scope of the present invention.

Figure 8:
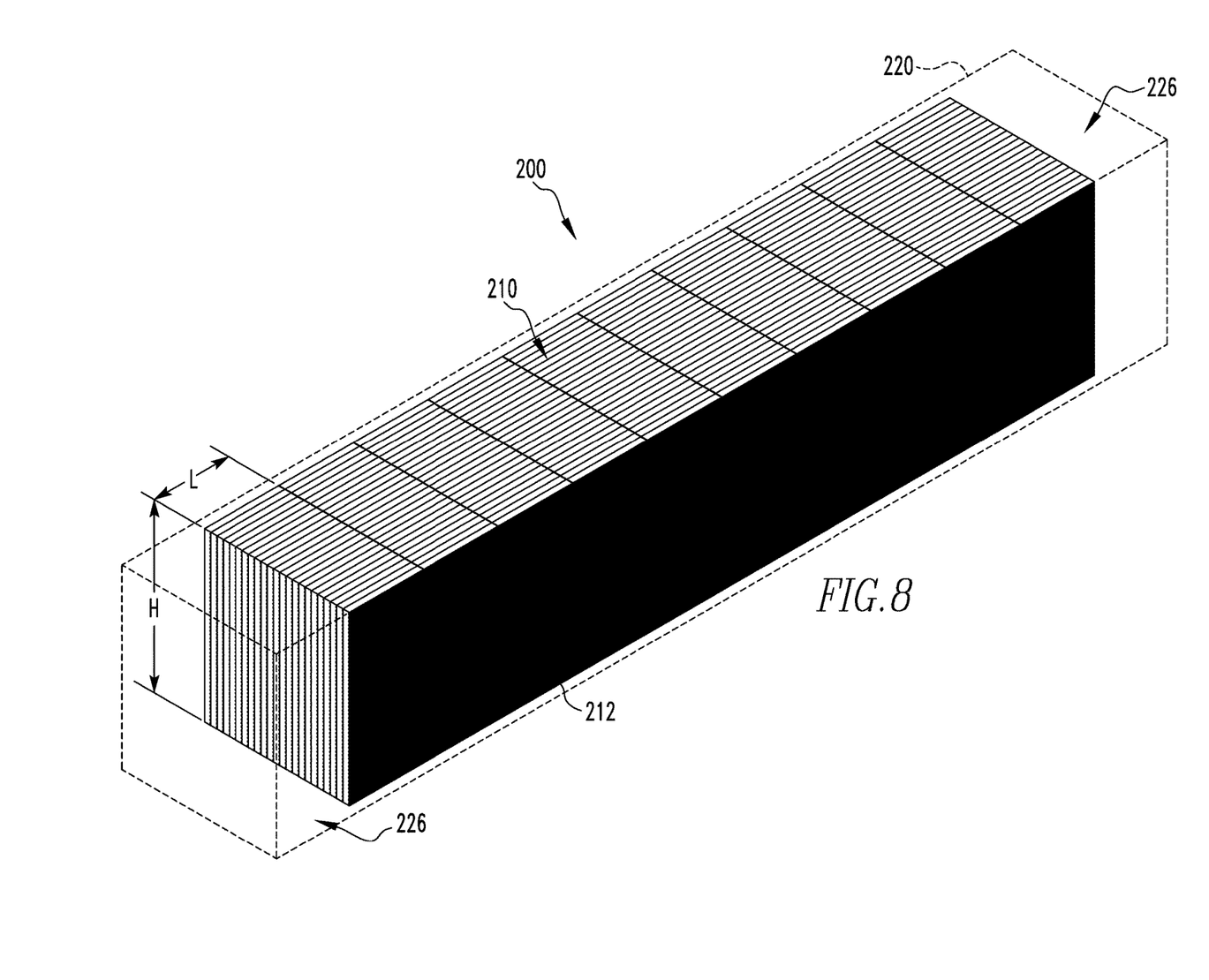
FIG. 8 is a partially schematic, simplified perspective view of another energy storage device utilizing another arrangement of plates in accordance with another example embodiment of the present invention shown disposed within a housing (shown in hidden line)

As grooves 212 serve as flowpaths for the heat transfer fluid, plates 210 are preferably disposed in direct contact with each other and thus may be readily arranged on edge, such as shown in FIG. 8 (similar to books on a bookshelf), or lying flat in a stack. In one example embodiment, the grooves 212 are cast as a feature of each plate 210 during formation of the plate 210 itself; however, it is to be appreciated that such grooves 212 may be formed via any other suitable method and/or at a later time without varying from the scope of the present invention. It is also to be appreciated that although in the illustrated embodiment such grooves 212 are formed only in one surface of each plate 210, such grooves may be formed in more than one surface (e.g., opposite facing surfaces) without varying from the scope of the present invention.

Figure 11:
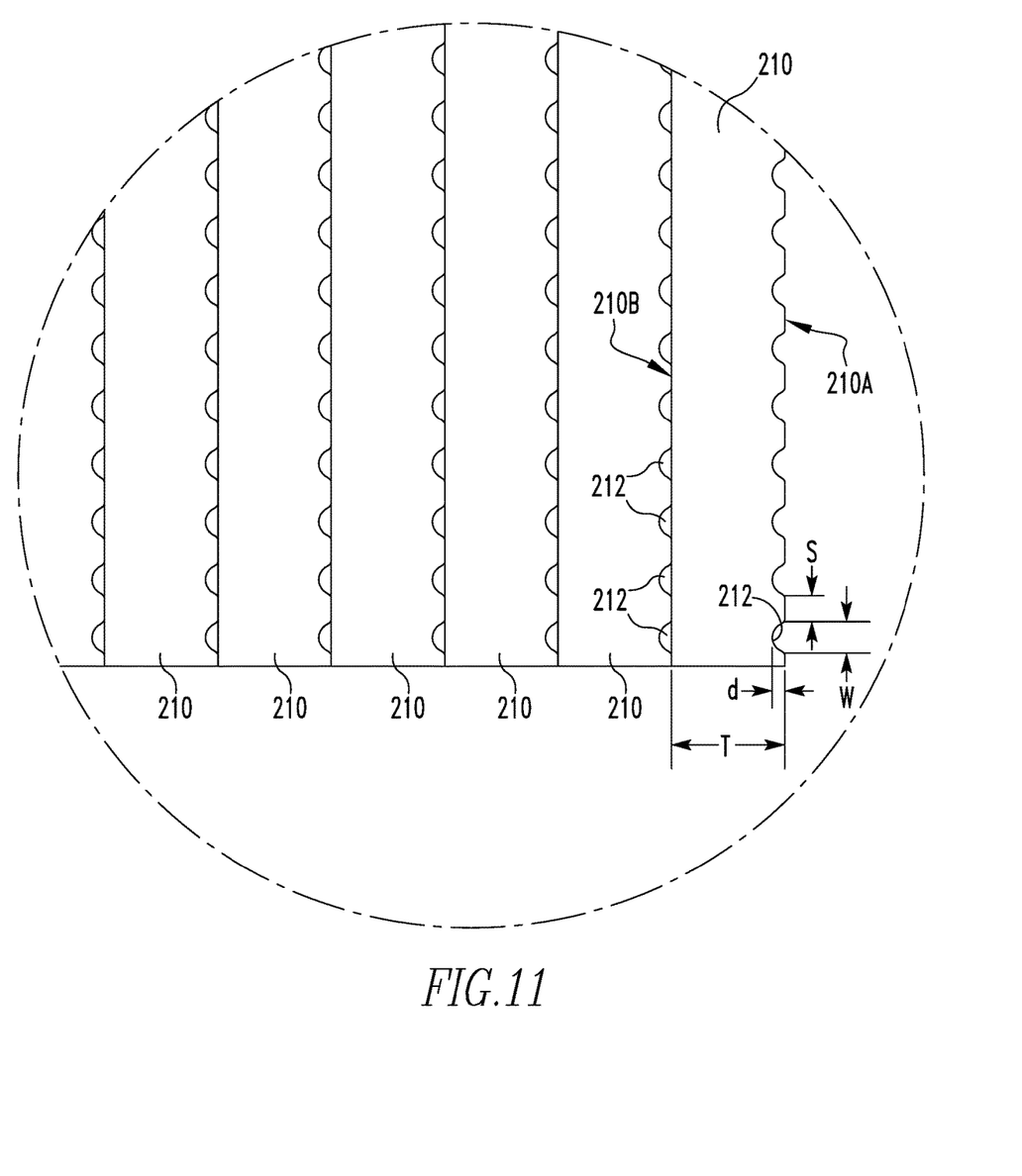
FIG. 11 is an enlarged view of a portion of the elevation view of FIG. 10 as indicated in FIG. 10.

In the example embodiment shown in the detail view of FIG. 11, each groove 212 is generally shaped like a circular segment when viewed along each groove, although grooves of other shape or shapes may be employed without varying from the scope of the present invention. Preferably, the edges of each groove are radiused or chamfered so as to minimize stress concentrations. Continuing to refer to FIG. 11, each groove 212 extends inward a depth d from a first surface 210A of each plate 210 toward an opposite second surface 210B, with the first and second surfaces 210A, 210B generally defining a thickness T of each plate 210 and adjacent grooves being spaced apart a separation distance S. In example embodiments of the present invention plates 210 having a thickness T generally between 0.5 and 6 inches have been employed, although other thicknesses may be employed without varying from the scope of the present invention. In such embodiments, grooves having depths d of from about 0.25 inches to about 1 inch, widths W of about 0.5 inches to about 2.5 inches, and separation distances S of about 0.25 inches to about 2 inches have been employed, however, it is to be appreciated that other dimensions may be employed without varying from the scope of the present invention. It is also to be appreciated that grooves of other shapes may be employed without varying from the scope of the present invention.

Figure 9:
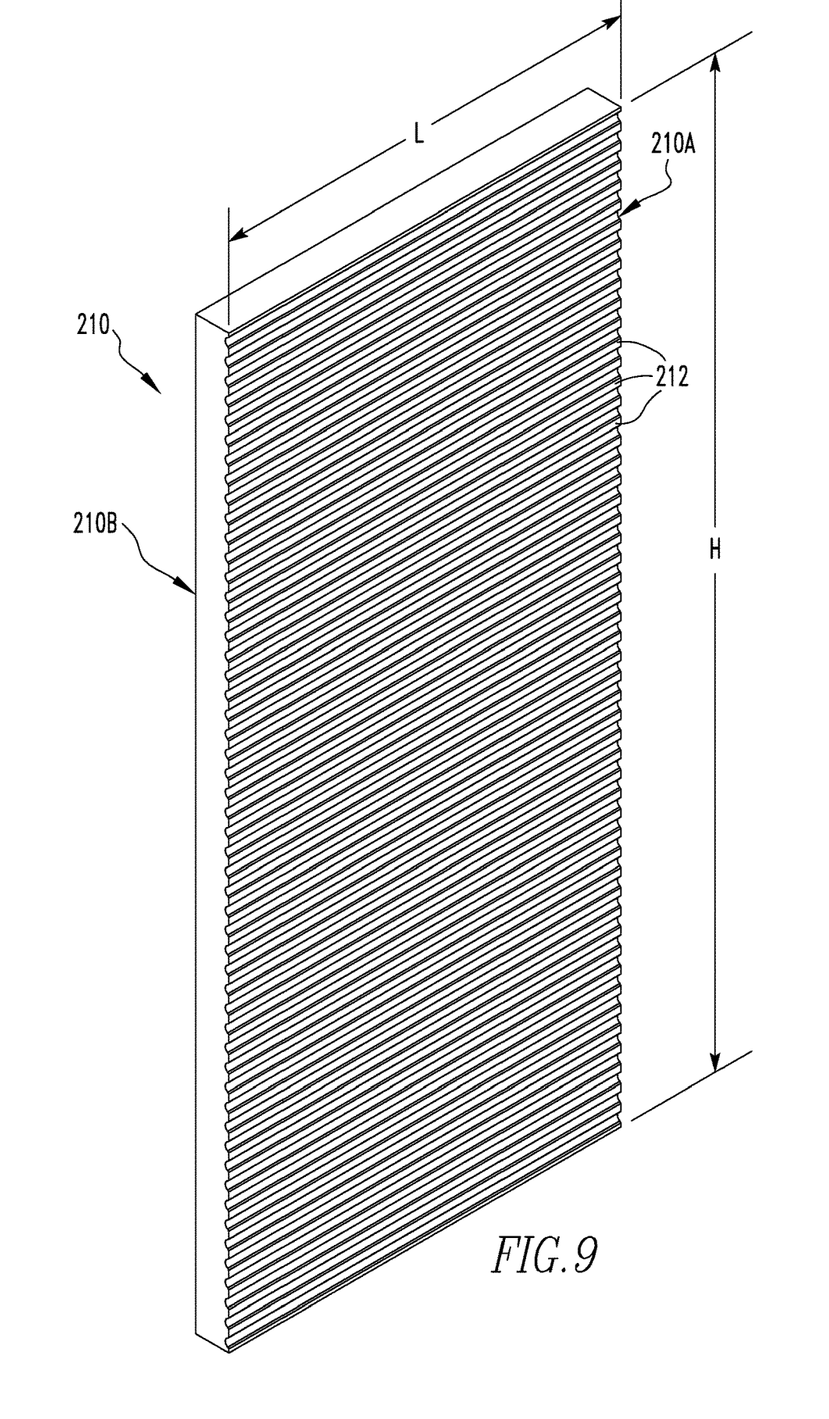
FIG. 9 is a simplified perspective view of one of the plates of the arrangement of FIG. 8.
Figure 10:
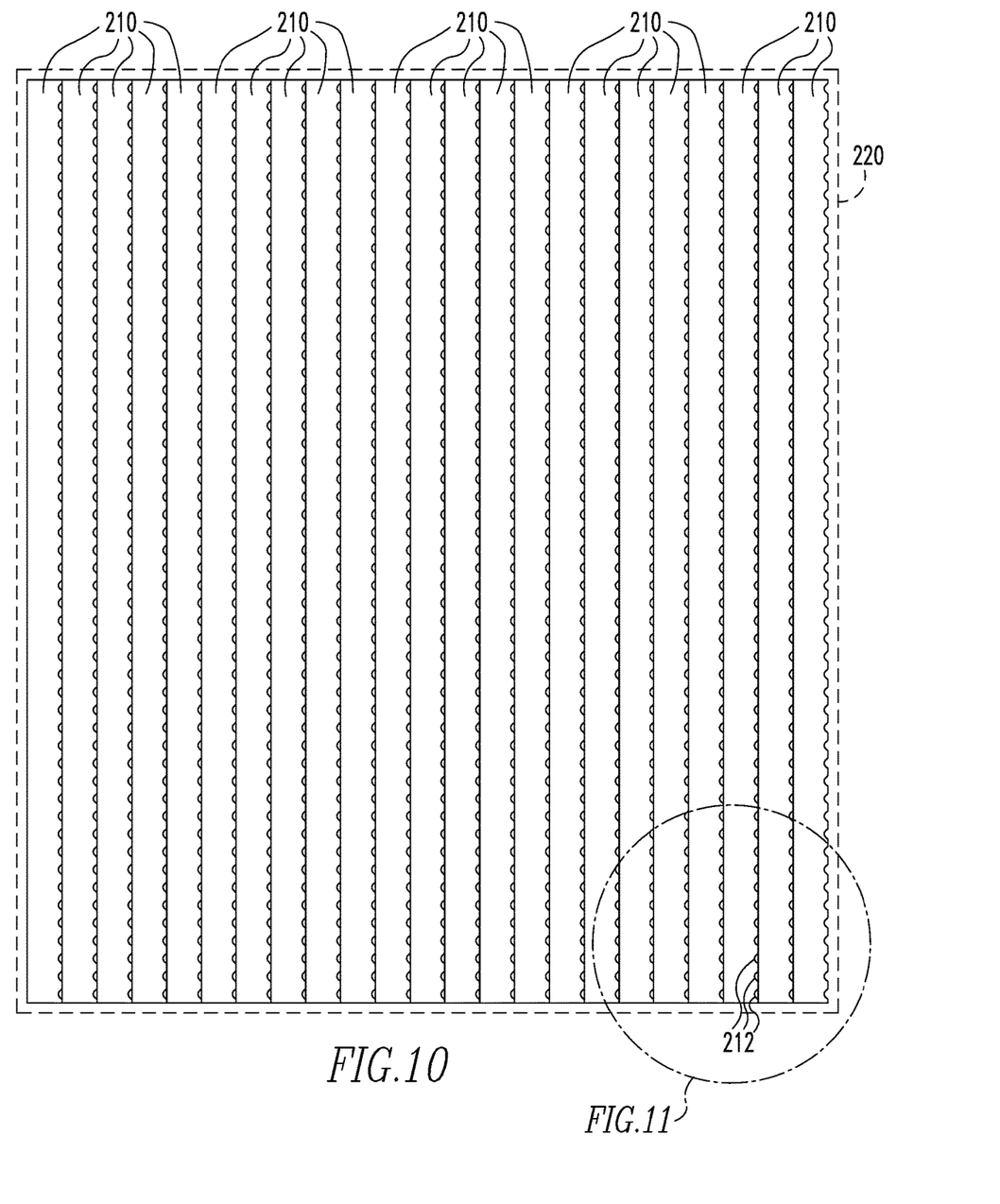
FIG. 10 is a simplified elevation view of an end of the arrangement of plates of FIG. 8.

Referring to FIGS. 8 and 9, each plate 210 extends a length L, in a direction between the opposite edges between which the grooves 212 extend, and a height H in a direction generally perpendicular to the direction in which the grooves 212 extend. In example embodiments of the present invention, plates 210 having a length L of about 2 feet to about 4 feet and a height of about 8 feet to about 9 feet have been employed, however, plates 210 of other dimensions may be employed without varying from the scope of the present invention. The plurality of plates 210 utilized in energy storage device 200 illustrated in FIG. 8 are arranged in 10 rows, with each row having 23 plates. It is to be appreciated that one or both of the quantity of rows and/or plates per row may be varied without varying from the scope of the present invention.

It is to be appreciated that embodiments of the present invention eliminate the need for metal piping within the module. The metal casing which is part of the functional unit, enables easy attachment of a simple plenum to each end of the flow spaces. The module utilizes the beneficial thermal properties of concrete, i.e., specific heat, durability, low-cost, ready availability, etc. The module requires only relatively low pumping power to move the heat transfer medium due to the sizing of the flow spaces between the concrete plates (and/or the grooves formed in the plates) and low velocities. The large wetted area provided by designs in accordance with the present concept helps offset the heat transfer challenge posed by many materials of high specific heat and provides for a short energy deposition along the axis of flow; thus supporting creation of a thermal gradient. The horizontal flow arrangement permits a longer thermal gradient distance without incurring a significant amount of static head pressure from the fluid. The horizontal flow arrangement also permits easy inlet and outlet piping attachment and unit replacement. The horizontal arrangement also permits ease of adding "thermal breaks" by simply fluting the concrete, i.e., adding vertical grooves to the concrete, or by using separate sections of concrete. This concept further eliminates the traditional use of labor intensive rebar for reinforcement.

The heat for heating the heat transfer fluid or medium can be derived from a heat exchanger in heat exchange relationship with the primary or secondary loop of a nuclear reactor, coal plant, solar-thermal or other similar heat source. Alternately, the heat can be derived from a gas turbine cycle or from a heat pump.

Accordingly, embodiments of the present invention provide the most economical energy storage currently available outside of pumped hydro or compressed air into a compatible geologic formation and does not have siting restrictions. The invention may utilize pre-existing equipment for a heat source, such as a nuclear power plant, inexpensive materials, and a simple design to solve a much grander challenge that has existed for some time without being practically addressed on a large commercial scale. The invention does not require a pressurized environment and presents a reduced risk of catastrophic safety events.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof

What is claimed is:

1. An energy storage device, comprising:
    a plurality of plates, comprising:
        a first plate, comprising:
            a first surface comprises a plurality of discrete grooves defined therein; and
            a second surface opposite the first surface, wherein the second surface comprises a substantially flat surface; and
        a second plate, comprising:
            a third surface comprises a plurality of discrete grooves defined therein; and
            a fourth surface opposite the third surface, wherein the fourth surface comprises a substantially flat surface;
    an inlet plenum configured to receive a heat transfer medium from a source and distribute the heat transfer medium through the grooves; and
    an outlet plenum configured to receive the heat transfer medium from the grooves and dispense the heat transfer medium to a return destination,
    wherein the first surface is configured to abut the fourth surface such that the plurality of discrete grooves of the first surface and the substantially flat surface of the fourth surface define discrete flow channels between the first plate and the second plate;
    wherein a portion of heat in the heat transfer medium is transferred to the first plate and the second plate in a charging mode of operation when the heat transfer medium is passed through the flow channels or a portion of heat in the plates is transferred to the heat transfer medium in a discharging mode of operation when the heat transfer medium is passed through the flow channels; and
    wherein the plurality of plates are comprised of concrete.

2. The energy storage device of claim 1, wherein each groove is generally shaped like a circular segment when viewed along each groove.

3. The energy storage device of claim 1, wherein the plurality of plates are arranged in a vertical stack with the first, second, third and fourth surfaces disposed horizontally.

4. The energy storage device of claim 1, wherein the plurality of plates are arranged vertically on edge, with the first, second, third, and fourth surfaces disposed vertically.

5. The energy storage device of claim 1, wherein each plate has a thickness between about 0.5 inches and about 6 inches.

6. The energy storage device of claim 5, wherein each plate has a thickness of about 4 inches.

7. The energy storage device of claim 1, wherein each groove has a depth of about 0.25 inches to about 1 inch.

8. The energy storage device of claim 7, wherein each groove has a width of about 0.5 inches to about 2.5 inches and is separated from adjacent grooves by a separation distance of about 0.25 inches to about 2 inches.

9. The energy storage device of claim 1, wherein the energy storage device is configured to operate approximately between 140° F. and 600° F.

10. The energy storage device of claim 1, wherein the plates comprise micro rebar or other three dimensional reinforcement.

* * * * *